(12) United States Patent  
Damzen (10) Patent No.: US 7,876,796 B2  
(45) Date of Patent: Jan. 25, 2011

(54) METHOD AND APPARATUS FOR COHERENTLY COMBINING LASER EMISSION

(75) Inventor: Michael John Damzen, London (GB)

(73) Assignee: Imperial Innovations Limited (GB)

( * ) Notice: Subject to any disclaimer, the term of this patent is extended or adjusted under 35 U.S.C. 154(b) by 206 days.

(21) Appl. No.: 12/306,010

(22) PCT Filed: Jun. 7, 2007

(86) PCT No.: PCT/GB2007/002108

§ 371 (c)(1),
(2), (4) Date: Dec. 22, 2008

(87) PCT Pub. No.: WO2007/148043

PCT Pub. Date: Dec. 27, 2007

(65) Prior Publication Data

US 2009/0232180 A1   Sep. 17, 2009

(30) Foreign Application Priority Data

Jun. 21, 2006   (GB) ................. 0612348.3

(51) Int. Cl.
H01S 3/082 (2006.01)

(52) U.S. Cl. .............. 372/29.023; 372/68; 372/94; 372/97; 372/102; 359/629

(58) Field of Classification Search ........ 372/29.023, 372/68, 94, 97, 102; 359/629
See application file for complete search history.

(56) References Cited

U.S. PATENT DOCUMENTS 5,048,030 A   9/1991   Hiiro 7,599,405 B2 * 10/2009 Rogers et al. ........... 372/6

FOREIGN PATENT DOCUMENTS

| EP | 1648056 A1 | 4/2006 |
|---|---|---|
| WO | 95/25367 A1 | 9/1995 |
| WO | 2004/068652 A2 | 8/2004 |

OTHER PUBLICATIONS

International Search Report for PCT/GB2007/002108.

Damzen et al., Self-Adaptive Solid-State Laser Oscillator Formed by Dynamic Gain-Grating Holograms, Aug. 15, 1995, Optics Letters, vol. 20, No. 16, pp. 1704-1706.

Lyndin et al., Laser System Composed of Several Active Elements Connected by Single-Mode Couplers, Dec. 1, 1994, Quantum Electronics, vol. 24, No. 12, pp. 1058-1061.

Morel et al., Coherent Coupling of an Array of Nd(3+)-Doped Single-Mode Fiber Lasers by Use of an Intracavity Phase Grating, Sep. 15, 1993, Optics Letters, vol. 18, No. 18, pp. 1520-1522.

(Continued)

*Primary Examiner*—Minsun Harvey  
*Assistant Examiner*—Michael Carter  
(74) *Attorney, Agent, or Firm*—Brooks Kushman P.C.

(57) ABSTRACT

A laser system comprises first and second laser sub-cavities each including a gain medium arranged to produce volume gain gratings. The laser system further includes a beam combiner arranged to combine emission from each cavity and direct emission from one cavity to the other. As a result a stale, phase-locked coherently combined emission system is provided.

10 Claims, 6 Drawing Sheets

OTHER PUBLICATIONS

Sabourdy et al., Coherent Combining of Two Nd:YAG Lasers in a Vernier-Michelson-Type Cavity, 2002, Applied Physics B: Lasers and Optics, vol. B75, No. 4-5, pp. 503-507.

Thompson et al., Operation of a 33-W, Continuous-Wave, Self-Adaptive, Solid-State Laser Oscillator, May 2003, Journal of the Optical Society of America B, vol. 20, No. 5, pp. 857-862.

Trew et al., Multiwatt Continuous-Wave Adaptive Laser Resonator, Sep. 15, 2000, Optics Letters, vol. 25, No. 18, pp. 1346-1348.

* cited by examiner

METHOD AND APPARATUS FOR COHERENTLY COMBINING LASER EMISSION

The present invention relates to lasers, and more specifically, a method and apparatus for coherently combining laser emission.

A key problem in scaling lasers to higher power is the heat deposited in the laser material by the pumping source. The heating is a side effect that is created alongside the creation of the medium excitation (known in the art as population inversion) required for the laser action process. The heating leads to temperature distributions and stresses in the laser material that cause local variations in the refractive index that degrade the optical quality of the laser radiation. The optical degradation tends to leads to reduced spatial quality and may also reduce the spectral quality and efficiency of the laser. For some applications it is highly desirable for the laser to operate with high spatial quality mode (ideally, fundamental spatial mode), with other applications also narrow spectral linewidth (ideally, single longitudinal mode), and in some cases it is desirable to operate with high efficiency to minimise the electrical input power requirement as well as cost. The increasing thermally induced optical distortion as the laser is scaled to high powers leads to limitations in the applications of high power lasers. At sufficiently high pump powers the heating effects lead to stresses that cause damage to the laser amplifier material (e.g. crystal fracture in solid-state lasers).

The heat-induced degradations in laser-performance are relevant to all class of lasers and in particular solid-state lasers. In solid-state lasers, several laser amplifier configurations have been devised to reduce the thermal distortion effects including using slab, thin disc and fibre geometries. Whilst these geometries may achieve improved thermal management and laser performance compared to the traditional rod geometry, they do not eliminate thermal degradation and damage issues which still become problematic again, albeit at higher power.

An alternative approach is to multiplex several laser amplifier sources, arranged in parallel, to achieve higher power laser emission by summing the optical outputs of each amplifier. This approach is attractive since it offers the potential for almost unlimited power scaling. Each amplifier can individually operate at a power level at which thermally induced distortions are not excessive, and power scaled by the number of amplifier units used. However, it has considerable difficulties. A particular problem is that independent laser cavities will tend to operate on slightly different frequencies and different phases, or stochastically time-varying phases of the output optical field. The consequence is that it is not possible, under normal circumstances, to combine independent laser output fields (e.g. by means of beam couplers or diffractive optical elements) into a single output field with the sum of the powers of the individual lasers. This non-optimal combination of separate lasers is what is known in the art as incoherent addition. An additional but related problem is that the transverse spatial distributions of the laser output fields must also be correlated in amplitude and phase. Spatially incoherent addition of the outputs may increase the output power but will lead to decrease in the spatial quality, characterised by increase in the so-called beam quality $M^2$ factor. Spectral combining, in which each laser has a discretely separate wavelength, can be achieved but at the expense of increasing spectral bandwidth and limited by the availability of laser media with appropriately broad or diverse lasing transitions and the spectral bandwidth of the beam combining elements. To achieve the optimal combination that can preserve both high spatial quality and spectral purity requires coherent addition, in which the phase distributions of all the optical fields, in both space and time, are perfectly correlated to give constructive interference whereby all the powers are added positively in the resultant output field. The challenge therefore for coherent beam combining is to ensure correlation of the phase (spatial wavefront distribution and absolute phase) of the individual beams to be combined and a suitable method for achieving the beam combination.

Figure 1:
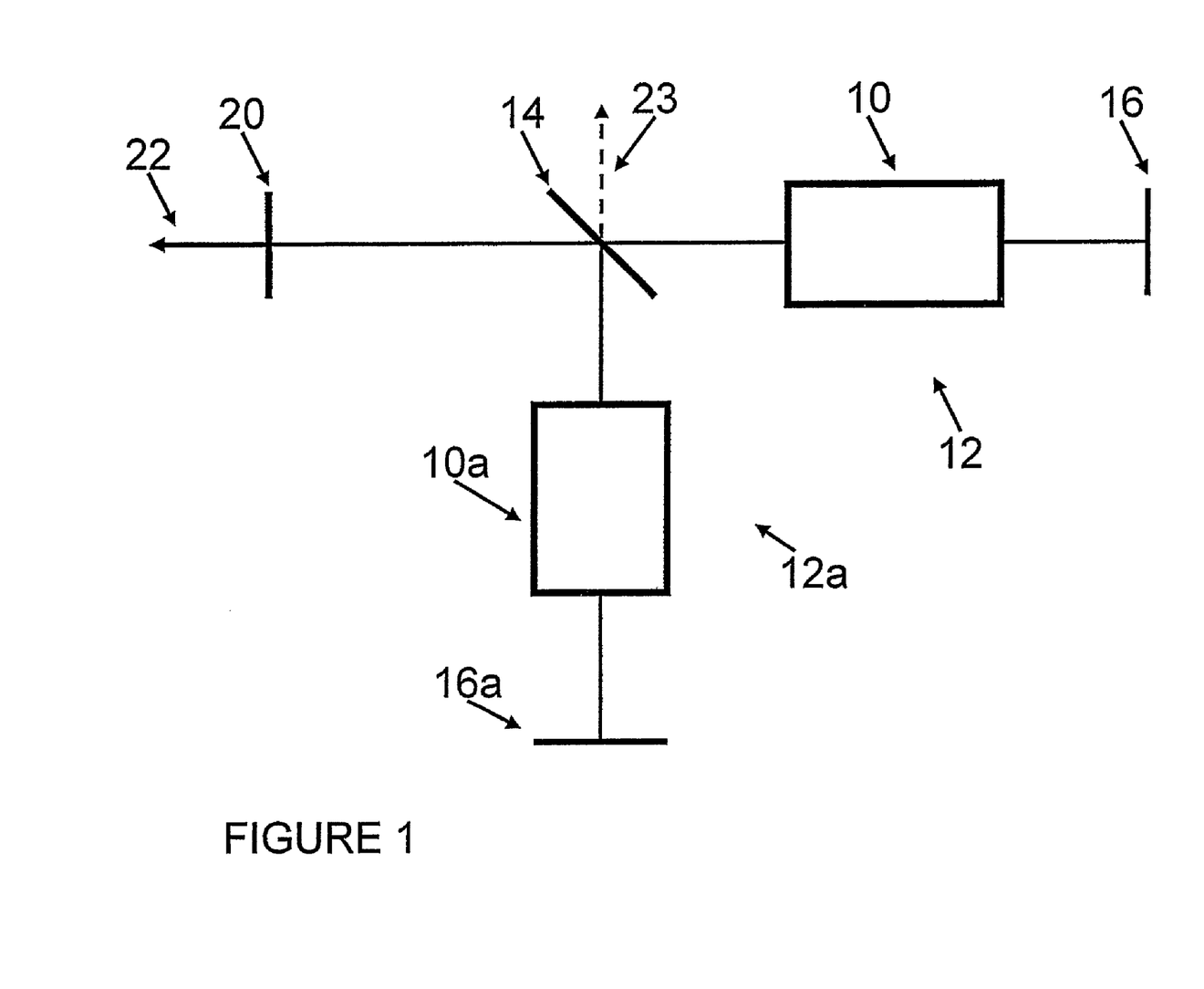
FIG. 1 is a schematic diagram embodying a prior art laser system.

FIG. 1 shows a prior art method of coherently combining laser outputs of two laser sub-cavities 12 and 12a. Laser sub-cavity 12 contains a gain medium 10 and has a high reflectivity end mirror 16, whilst laser sub-cavity 12a has a separate gain medium 10a and high reflectivity end mirror 16a. One laser cavity is formed by sub-cavity 12 and mirror 20 with intermediate transmission through beamsplitter/combiner element 14 and a second laser cavity is formed by sub-cavity 12a and mirror 20 with intermediate reflection from element 14. Element 14 would typically be a partial mirror with 50% reflectivity and 50% transmission to the laser radiation. Laser gain elements 10 and 10a would be pumped by an external energy source to produce excitation in the laser material to achieve light amplification in the known manner of laser action. For the purposes of this illustration, elements 10 and 10a are assumed to be similarly constructed gain materials experiencing similar pumping. The two laser sub-cavities 12 and 12a share a common partially transmitting output mirror 20. Whilst this arrangement provides a combined output 22, the difficulty is that there is also a possible second output 23 at the beam splitter 14. If the laser fields from the two sub-cavities are incoherent this output can be as strong as the output 22 and hence no power scaling of output 22 is achieved and the element 14 can be viewed as acting as a loss element. This difficulty can be alleviated if the coupled laser cavity system can achieve phase locking by finding a common frequency, spatial mode and relative phase for coherent addition at the beamsplitter 14 that can substantially eliminate the output 23. However, this phase locking can be difficult to achieve well in practice since it is necessary to accurately control the angular and linear positions of the cavity mirrors (e.g. 16, 16a) in each cavity, or difficult to maintain due to the effects of environmental perturbations (e.g. vibrations, air currents and thermal expansion) to the cavities.

The ability to find a common mode that can coherently combine more than two sub-cavities is even harder to achieve than for two sub-cavities due to the extra constraints and complexities. A prior art solution to achieve a phase-locking of all the beams is to incorporate multiple active phase control elements into the separate beams before they are to be combined, together with feedback control systems to actively optimise the relative phasing of the individual beams. Unfortunately, active phase control can be complex, cumbersome and add extra expense to the system and it must also be able to operate at rate faster than the cavity perturbations. A further difficulty is that the beams should have identical spatial distributions and this requires matched cavity designs including incorporating the effects of thermally-induced lensing and distortions.

The prior art is described in:

M. J. Damzen, R. P. M. Green and K. S. Syed, Opt. Lett., 20, 1704-1706 (1995)

B. A. Thompson, A. Minassian and M. J. Damzen, J. Opt. Soc. Am. B 20, 857-862 (2003)

International patent application WO95/25367

The present invention is set out in the claims.

As a result of the inventive features, the present invention allows for high power scaling of laser emission, by coherently combining laser emission from two or more laser cavities. In the invention, volume gain gratings are formed that act as adaptive diffraction elements that can allow each cavity of the system with separate laser amplifier element to converge on a common phase as a result of emission from each cavity passing through each other cavity and feedback to the grating formation. This phase equality allows the output beams to constructively interfere at suitable beam combining element(s) to produce a predominantly single beam with combination of output powers, high spatial quality laser emission. Unlike prior art solutions, the coherent combination is achieved automatically by the nonlinear gain grating formation and without the need for complex actively controlled phase-matching equipment.

Embodiments of the inventions will now be described, by way of example, with reference to the following figures, of which.

Figure 2:
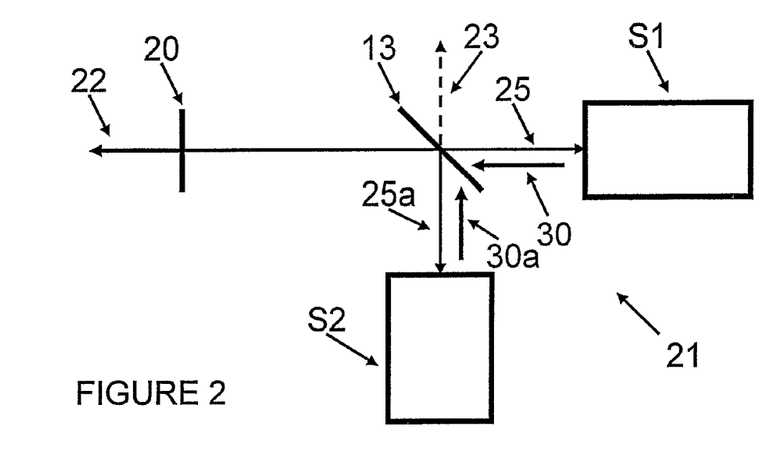
FIG. 2 is a schematic representation of a laser system according to the present invention.

FIG. 2 shows a first embodiment of the present invention. A laser system is generally designated 21, and incorporates first and second laser sub-cavities S1 and S2. The system 10 has a common semi-transparent output coupling mirror 20 providing an output beam 22 and an intermediate beamsplitter 13 that transmits a fraction of the radiation returning from mirror 20 to form a beam 25 directed towards sub-cavity S1 and the remainder reflects from 13 to form a beam 25a directed towards sub-cavity S2. Each sub-cavity S1, S2 includes a number of elements appropriately arranged. The construction and principles of operation of the invention are described in detail in the following. The advantage achieved by this invention is the generation of return beams 30, 30a from elements S1, S2 that automatically achieve coherent combination at the beamsplitter 13 to achieve a single combined output 22, and substantially eliminate secondary output 23.

Figure 3:
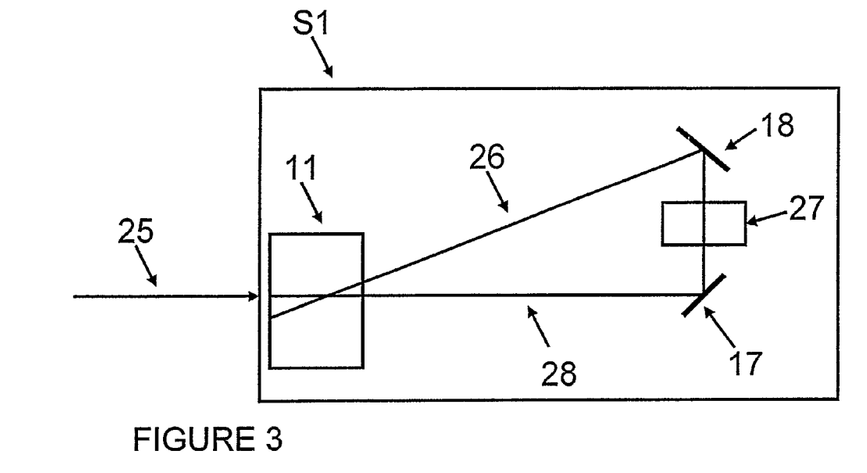
FIG. 3 is a schematic representation of a self-intersecting loop amplifier sub-cavity element.

FIG. 3 shows an arrangement of sub-cavity S1. There is a laser medium 11, a set of mirrors 17, 18, and a non-reciprocal transmission element 27 (which is schematically illustrated in FIG. 4, and described later). The set of mirrors redirect the radiation 25 after it has passed through the gain medium 11 to form a return beam 26 that self-intersects with the beam 25 inside the laser medium 11. This geometry is termed a self-intersecting loop. Sub-cavity S2 is similarly configured to sub-cavity S1, by gain medium 11a, non-reciprocal transmission element 27a, and mirrors 17a, 18a so arranged to similarly form a self-intersecting loop geometry. The laser media 11, 11a are excited by a pump source to provide amplification of optical radiation in the manner of a laser amplifier well known in the art.

The self-intersecting loop geometry S1 is known in the art [1,2] to be capable of formation of volume gain gratings in the gain medium 11 and to be able to form a return beam 30 that is the wavefront reverse of beam 25 and travelling in the opposite direction. Feedback between the output coupler 20 and the self-intersecting loop geometry in a laser amplifier S1 results in the simultaneous build-up of laser cavity radiation 25, 30, leading to a laser output 22. This interaction will be known to the skilled reader and is described here to provide some of the key principles. However for the purposes of completeness reference is made hereby to International patent application WO95/25367 and references 1 and 2, the contents of which are incorporated herein by reference as fully set out herein.

Figure 5A:
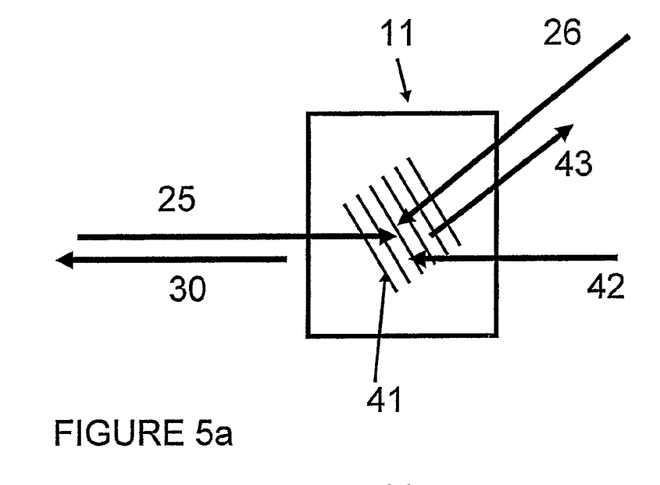
FIG. 5a is a schematic representation of the formation of a gain grating formed by gain saturation due to interference of a set of beam, and its operation as a diffractive optical element.

Some key elements of the self-intersecting loop geometry are described below for the purposes of understanding its operation in the present invention. FIG. 5a illustrates schematically the formation of a volume gain grating. It is known in the art that the self-intersecting loop geometry in a laser amplifier medium can lead to the formation of a volume gain grating [1,2] by a gain saturation process. In particular, under the assumption of steady-state interaction, the gain profile in a gain medium physically varies by the following equation (1):

$$\alpha(r) = \frac{\alpha_0}{1 + I(r)/I_S} \quad (1)$$

where $\alpha(r)$ is the local gain coefficient of the medium, $\alpha_0$ is the unsaturated gain coefficient when no laser radiation is present, $I(r)$ is the local intensity in the medium and $I_S$ is the saturation intensity of the gain medium. As a result, the intensity interference pattern of the input beam 25 and return beam 26 of the self intersecting loop can produce a local modulation of the gain coefficient that forms a volume gain grating 41 at the half angle of the intersecting beams. This gain grating formation process, illustrated schematically in FIG. 5a, shows that the direction of the grating planes 41 is along the bisector of the interfering beams 25, 26 where they intersect in the gain medium 11. The reader skilled in the art will understand that the gain grating can act as a diffractive element. In particular, if a beam 42 is incident on the gain grating, a diffracted beam 43 can be produced, in addition to an amplified transmission beam 30. A strong diffraction condition will, under normal circumstances, occur when the beam 42 is at the same frequency and in the reverse direction to the incident beam 25, in which case diffracted beam 43 is in the reverse direction to beam 26. It will be understood therefore that beam 43 will retrace a self-intersecting loop path in the reverse direction to the incident loop path 25, 26. In addition, diffraction from the gain grating 41, together with the loop path, can be seen to cause the beams 42, 43 to complete a ring cavity. The source of the reverse beams 42, 43 can be from injection of an external beam. If no injection beam is used the source of the reverse beams 42, 43 will be from amplified spontaneous emission originating in laser medium 11. If the sum of the diffraction efficiency of the gain grating 41 and the self-intersecting loop transmittance is greater than unity, the condition for laser oscillation is achieved and a low level radiation 42 can grow to a high power level in the manner of a laser, resulting in a high power return beam 30.

A key feature of the volume gain grating, with regard to this present invention, is not only its ability to form a backward oscillation that also one that has the reversed wavefront with respect to the input beam 25, 26. This is because the gain grating 41, formed by an interferogram of beam 25 and loop beam 26, encodes the spatial information of the relative wavefront of the beams. The lowest order self-reproducing spatial mode of the backward self-intersecting loop has the reverse wavefront of the incident beam. This property produces a return beam 30 that is wavefront reversed to incident beam 25 and hence is distortion corrected for any aberration in amplifier 11, such as may occur at high pump powers.

Figure 5B:
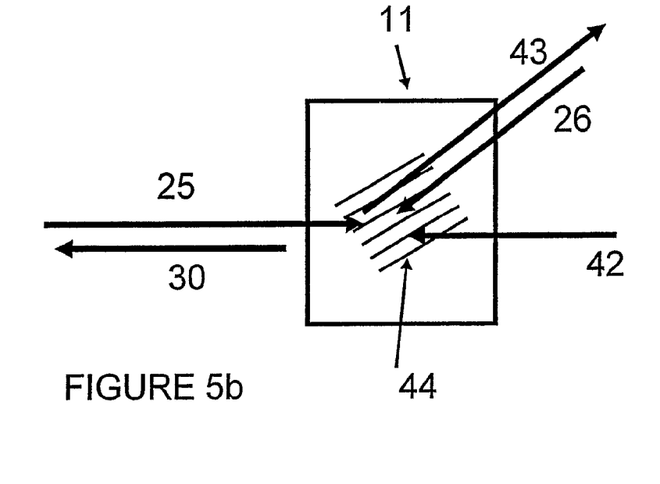
FIG. 5b is a schematic representation of a second gain grating that can form due to gain saturation by interference of another set of beams.

The presence of beams 42, 43, in addition to incident beams 25, 26 can lead to formation of further gain gratings. Notably, beam 26 and beam 42 can produce an intensity interference pattern that will result in formation of another gain grating 44 as illustrated in FIG. 5b. The gain grating 44 has planes at the bisector of beams 26, 42. Formation of gain grating 44 will result in diffraction of beam 25 into the path of beam 43. Under the right conditions, this will constructively reinforce the strength of the return beam 30 produced by gain grating 41.

Figure 4A:
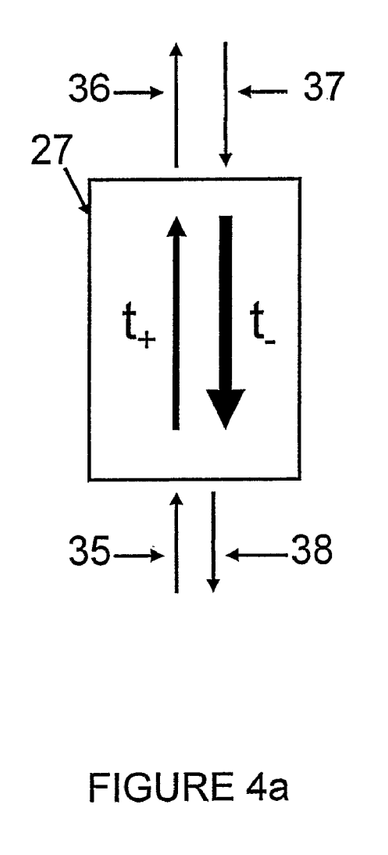
FIG. 4 is a schematic representation of a non-reciprocal transmission element that is a sub component of the self-intersecting loop amplifier element.
Figure 4B:
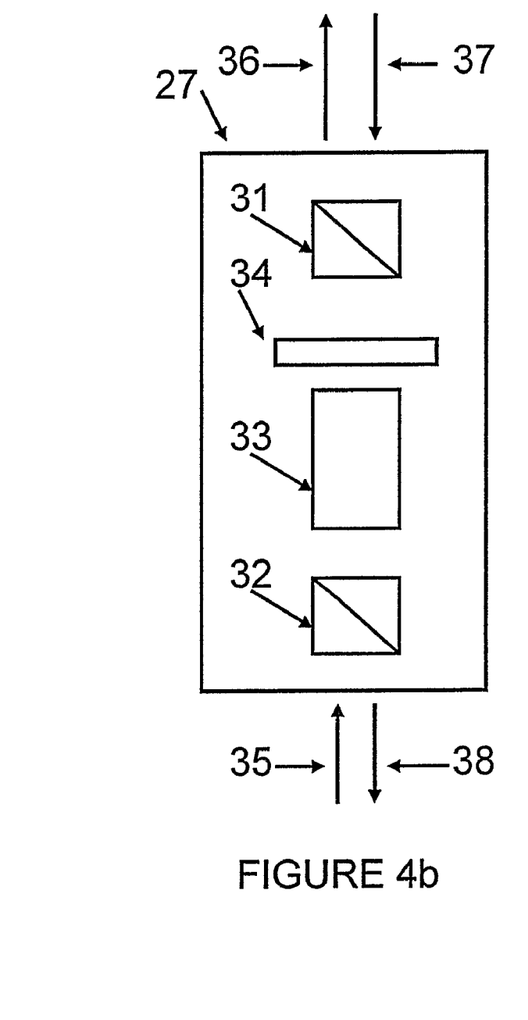

It should be clear that an incident beam 25 in a self-intersecting loop geometry in a laser amplifier S1 can result in the formation of a reverse beam 30. The efficiency, or reflectivity, of the element S1 can be defined as the ratio of the power in the reverse beam 30 to that of the incident beam 25. Maximisation of the reflectivity can be achieved by optimisation of the gain grating formation processes, and this can be achieved by use of a non-reciprocal transmission element 27, inserted in the loop path as explained in detail in [1, 2, 3]. FIG. 4a shows the operation principle of the element 27 that provides a different transmission in the forward direction ($t_+$) compared to the transmission in the backward direction ($t_-$). Generally, a low transmission ($t_+$) is set in the forward direction ensuring beam 26 is of a similar strength to incident beam 25, to optimise the modulation depth and diffraction efficiency of the gain grating. The backward transmission factor ($t_-$) is maintained as high as possible to optimise the growth of the backward loop radiation 42,43, and hence of output beam 30. A second feature of the element 27 that can improve the strength of the return beam 30 is to introduce a differential phase shift of 180 degrees between the forward and backward loop paths. This can achieve a resonant condition for beams 42,43 to operate in the backward loop cavity at the same wavelength as the incident beam 25, 26, by compensating for a 180 degree phase shift that can occur on diffraction from the gain grating. The 180 degree grating phase shift can be understood by the fact that the gain grating is in anti-phase (180 degree shifted) from the intensity interference pattern of the writing beams 25,26, since the gain saturation process causes minimum local gain at maximum intensity according to equation 1. FIG. 4b shows an implementation of the non-reciprocal transmission element, composed of two polarisers 31 and 32 with parallel transmission axis, and between them is placed a half-wave retardation plate 34 and Faraday rotator 33 with 45 degree rotation angle. In one direction the polarisation rotation of the waveplate 34 and Faraday rotator 33 add and in the other propagation direction they subtract. This leads to a different transmission through the polarisers in the one direction compared to the other. At one extreme, when the waveplate 34 has rotation of 45 degrees, the total forward rotation can be 90 degrees and forward transmission is zero while the backward total rotation is zero and forward transmission is unity. The forward transmission may be set low but non-zero to ensure the optimum grating writing process between beams 25 and 26. It will be noted that the same magnitude of forward transmission can be achieved for two values of forward rotation of 90+δ and 90−δ, where δ is an angle. However, there is a phase difference of 180 degrees between the output fields in these two cases. This allows the non-reciprocal transmission element 27, to introduce a 180 degree phase shift between the forward and backward transmission in the loop by choice of the sign of δ, which is selectable by rotation angle of the waveplate 34. The non-reciprocal phase shift of 180 degrees between forward and backward loop paths together with the 180 degree (antiphase) gain grating diffraction ensures a resonant loop cavity oscillation 42, 43 can be obtained at the same frequency as the input frequency of beam 25. This also produces the condition for constructive contribution to the return beam 30 by the second gain grating shown in FIG. 5b.

Feedback between the self-intersecting loop S1 and from output coupler mirror 20 can lead to formation of a laser oscillation. A requirement to achieve laser threshold of oscillation is a sufficiently high gain in the laser amplifier 11, together with a suitable diffraction efficiency of the gain gratings produced. As a result of the interaction between the input radiations 25 and 25a and loop return beams 26 and 26a, the volume gain diffraction gratings formed in gain media 11 and 11a, respectively, encode real information on the phase distribution of the beams 25 and 25a in each cavity. The return beams 30, 30a are found to have a reversed wavefronts to the incident wavefronts 25, 25a, respectively. The phase distortions induced in the laser amplifiers 11, 11a are cancelled out. The return beams 30, 30a are also at the same frequency of the incident beams 25, 25a.

Combination of the output mirror 20 and either of the self-intersecting loops S1 (or S2) provides a "self-adjusting" laser cavity where the cavity converges on a single spatial and single frequency mode, with correction of the distortions in laser amplifier. This is the preferred and highest growth solution that will be selected since it results in the most efficient gain grating, and hence strongest feedback 30 (or 30a). Since the cavity is closed by self-formation of a gain grating, rather than having a fixed cavity length, the cavity is free to select any of a continuum of frequencies, rather than the discrete set of frequencies associated with a non self-adjusting laser cavity, and will tend to operate centred at the frequency with the highest growth rate, such as determined by the peak spectral gain of the laser transition in gain medium 11.

The invention here described provides two similar and coupled self-adjusting lasers. The two cavities can individually self-adjust. However, the coupling of the two sub-cavities S1 and S2 as provided by the beamsplitter 13 and having a common output mirror 20 results in a common self-adjusting super-cavity operation. The presence of the beam splitter 13 ensures the two sub cavities are not independent in operation. The return radiations 30 and 30a from the two sub-cavities S1 and S2, respectively, will both reflect from the common output coupler 20 and then be split by the beam splitter 13. Hence, the inputs 25, 25a, into sub-cavity S1 are made up of the return from both S1 and S2. Since the input of two different frequencies and/or two different spatial modes would lead to impaired formation of the gain gratings in each self-intersecting loop S1 and S2, as well as loss 23 at the beam splitter 13, the coupled cavities will favour a single common frequency and spatial mode, optimising returns 30, 30a of S1, S2 and minimising loss 23 at 13. The optimum phase difference at 13 between returns from S1 and S2 to minimise loss output 23 can be found by the cavity finding a common frequency that achieves this condition, since it maximises the growth rate of the combined super-cavity. The result is a coherently combined common output 22 from output coupler 20, with high quality spatial mode due to the intracavity distortion correction provide by elements S1 and S2 and a single frequency, together with minimised loss output 23. The advantage of this invention over prior art solutions, such as that illustrated in FIG. 1, is that the coherent combination of high spatial quality, narrow bandwidth laser radiation is achieved without requirement of precise cavity length adjustments or length stabilisation or precise cavity spatial mode design, and even in the presence of intracavity aberrations, including thermally-induced distortions that can occur in the amplifier elements 11 and 11a.

It will be appreciated that the approach can be extended to other appropriate configurations of laser cavities and any number of such sub-cavities with self-intersecting loop sections as long as there is interaction between the emission of each cavity.

Figure 6:
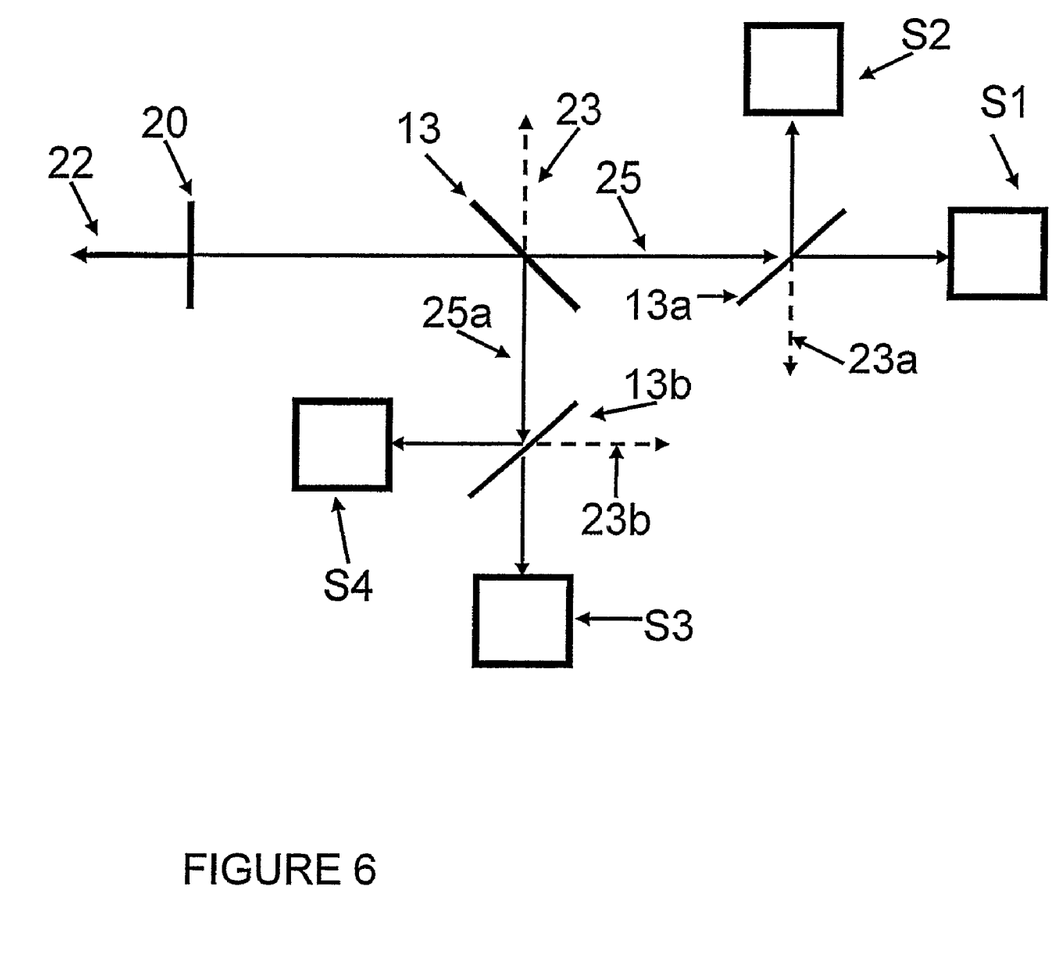
FIG. 6 is a schematic representation of a laser system according to a second embodiment of the present invention.

For example, a second embodiment is shown in FIG. 6. In addition to sub-cavities S1 and S2, (as described previously with the sub elements depicted in FIG. 3) combining at beam splitter 13a, there are two further sub-cavities S3 and S4, combining at beam splitter 13b. The pair of sub-cavities S1 and S2 are themselves combined with pair of sub-cavities S3 and S4 by beam splitter 13 to form a combined output 22 from a common output coupler 20. It will be appreciated that since each pair of sub-cavities can self-optimise their growth rate by forming return beams that minimise the outputs 23a and 23b, and similarly this ensemble of sub-cavities, so arranged, forms a super-cavity which will see the maximum growth rate by also minimising the output 23 from beam splitter 13. The super-cavity will therefore find a common frequency and spatial form that maximises the output 22 from the common output coupler 20 by coherent combination of all sub-cavities S1, S2, S3, S4.

It will be appreciated that additional cavities can be incorporated using further beam splitters as appropriate. For example, 8 sub-cavities can be combined by adding 4 new sub-cavities S5, S6, S7, S8 similarly arranged to S1, S2, S3, S4 with beam splitters 13a, 13b and 13 as in FIG. 6 and the interposition of a further beam splitter before output coupler 20 that has in the one arm S1, S2, S3, S4 and in the other arm S5, S6, S7, S8. Further scaling to 16 sub-cavities, 32 sub-cavities, and higher powers of 2 sub-cavities can be achieved by further nesting of this principle.

Figure 7:
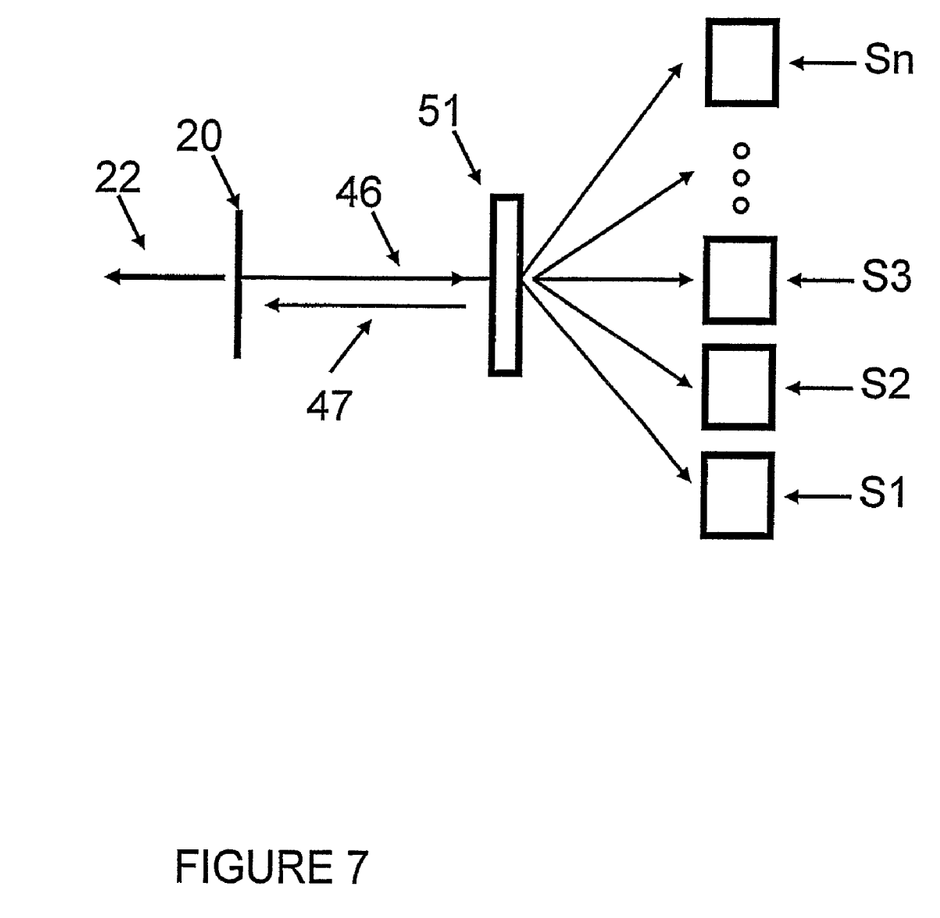
FIG. 7 is a schematic representation of a laser system according to a third embodiment of the present invention.

The above mentioned embodiments achieve coherent combination of nested pairs of sub cavities using coupling from beam splitters with a single reflection and single transmission. An alternative embodiment is shown in FIG. 7 in which multiple sub-cavities S1, S2, S3, . . . Sn are provided in conjunction with a beam splitter 51 and output mirror 20. In this case the beam splitter element 51 could be a diffractive optical element that splits a single beam 46 into multiple diffraction orders. If the element 51 is designed to form diffracted orders with equal splitting into each sub-cavity they will each interact via feedback from common output coupler 20 to form a super cavity where returns from the sub cavities will coherently sum at the element 51 to form a single combined return 47 and hence a single combined output beam 22. As before, each sub-cavity provides a self-intersecting loop geometry in a laser amplifier with non-reciprocal transmission element, as described with reference to FIG. 3.

As a result of the arrangement described above a laser system is provided including multiple cavities in which a common longitudinal (temporal) mode and common spatial mode can be achieved together with phase lock permitting constructive interference upon recombination of the beams at the output with good beam quality.

Although the invention embodiments shown in the figures depict particular layouts of elements it will be appreciated that these are for illustrative, purposes and other variations can be used without affecting the key principles underlying these inventions. For example, in FIG. 3, the self-intersecting loop is shown to be formed by two mirrors 17, 18, it can be formed by any other number of mirrors, or refracting or diffracting elements that so form the beam 25 into a loop that self-intersects the loop beam 26 with the input beam 25 at the gain medium 11. For example, the loop beam 26 is shown intersecting from opposite side of the gain medium to incident beam 25. The loop beam may also be arranged to loop and be incident on the gain medium 11 from the same side as beam 25, or from any other side of the gain medium 11, so long as the beams 25 and 26 self-intersect in a region of gain of element 11.

Additional optical components can be incorporated to improve performance, for example a Fabry-Perot element allowing frequency tuning which is otherwise converged on by the super-cavity dependent on the laser amplifier gain profile. Any appropriate means can be used for coupling the multiple cavities for example a reflective beam splitter or a diffractive optical element as appropriate.

The various materials from which the laser mirrors, beam splitters and output coupler are formed are well known to the skilled reader and are not described herein. For example the mirrors can be glass substrates with dielectric coatings as is well known in the art.

The gain medium can be any of a large number of materials, including solid-state, fibre, semiconductor, gas, liquid, with suitable pumping to provide excitation and optical gain in the manner of a laser. In the case of a solid-state laser material, such as Nd:YAG, the pumping might be from a discharge lamp, and the gain medium can be in the form of a rod or slab. Alternatively, the gain medium might be Nd:YAG or Nd:YVO$_4$; with pumping by semiconductor diode lasers.

The invention claimed is:

1. A laser system, for coherently combining emission from two or more laser cavities, comprising:
    two or more laser cavities sharing a common emission output, each cavity including a gain element arranged to produce volume gain gratings; and
    a beam combiner arranged to combine emission from each cavity and to return a portion of the emission from each cavity into each of the other cavities.

2. A laser system as claimed in any claim 1, wherein each of said cavities includes a self-intersecting loop path.

3. A laser system as claimed in claim 2 in which the loop path is formed of a plurality of mirrors.

4. A laser system as claimed in claim 2, wherein each gain element is provided at an intersection point of the loop path to provide, in operation, the formation of volume gain gratings.

5. A laser system as claimed in claim 1, further comprising a non-reciprocal transmission element in each loop path.

6. A laser system as claimed in claim 5, wherein the non-reciprocal transmission element is composed of a pair of polarisers with intermediate placement of a 45 degree Faraday rotator and a half-wave retardation plate.

7. A laser system as claimed in claim 5, wherein the non-reciprocal transmission element introduces a non-reciprocal phase shift of 180 degrees between the passage of the optical radiation in the one direction in the loop path to the other direction of the loop path.

8. A laser system as claimed in claim 1, comprising a beam combiner arranged to combine emissions from a first and a second cavity, a second beam combiner arranged to combine emission from a third and a fourth cavity, and a third beam combiner to combine emission of first, second, third and fourth cavity.

9. A laser system as claimed in claim 1, in which the beam combiner comprises a beam splitter.

10. A laser system as claimed in claim 1, in which emission from two or more cavities is combined at a common beam combiner comprised of a diffractive optical element.

* * * * *

UNITED STATES PATENT AND TRADEMARK OFFICE
CERTIFICATE OF CORRECTION

| | |
|---|---|
| PATENT NO. | : 7,876,796 B2 |
| APPLICATION NO. | : 12/306010 |
| DATED | : January 25, 2011 |
| INVENTOR(S) | : Michael John Damzen |

It is certified that error appears in the above-identified patent and that said Letters Patent is hereby corrected as shown below:

Column 8, Line 47, Claim 2:

After "as claimed in" delete "any claim 1"
and insert -- claim 1 --.

Signed and Sealed this
Nineteenth Day of July, 2011

David J. Kappos
*Director of the United States Patent and Trademark Office*